United States Patent [19]

Vallance et al.

[11] Patent Number: 4,865,787
[45] Date of Patent: Sep. 12, 1989

[54] METHOD FOR THE IMPREGNATION OF FILAMENT WOUND STRUCTURES WITH THERMOPLASTIC BINDERS

[75] Inventors: Michael A. Vallance, Schenectady; Gayle D. Tomkinson-Walles, Clifton Park; Roger N. Johnson, Hagaman, all of N.Y.

[73] Assignee: General Electric Company, Schenectady, N.Y.

[21] Appl. No.: 189,456

[22] Filed: May 2, 1988

Related U.S. Application Data

[63] Continuation of Ser. No. 886,507, Jul. 17, 1986, abandoned.

[51] Int. Cl.⁴ .................. B29C 39/42; B29C 41/04
[52] U.S. Cl. ..................... 264/101; 264/136; 264/311; 264/344; 264/258; 264/137
[58] Field of Search ............... 264/79, 338, 136, 137, 264/37, 204, 310, 311, 258, 316, 86, 101, 344, 40.6; 118/54, 61; 427/240, 215

[56] References Cited

U.S. PATENT DOCUMENTS

| | | | |
|---|---|---|---|
| 2,009,232 | 7/1935 | Hood | 118/61 |
| 2,054,155 | 9/1936 | Dulkin | 118/61 |
| 4,002,714 | 1/1977 | Usui | 264/311 |

*Primary Examiner*—Jay H. Woo
*Assistant Examiner*—Jeremiah F. Durkin, II
*Attorney, Agent, or Firm*—William H. Steinberg; James C. Davis, Jr.; Paul R. Webb, II

[57] ABSTRACT

Filament wound or dry lay-ups of structural shapes are impregnated with a binder of thermoplastic resin. Impregnation is achieve by adding a polymer solution to a centrifuge containing reinforcing material. The centrifuge is spun at high rotational speed. Solution is metered into the centrifuge and contacts the inner surface of the reinforicng material. A preheated carrier gas flow is circulated in the centrifuge using baffles, then released to a solvent recovery system. Alternatively, vacuum drying to recover solvent can be used.

9 Claims, 8 Drawing Sheets

METHOD FOR THE IMPREGNATION OF FILAMENT WOUND STRUCTURES WITH THERMOPLASTIC BINDERS

This application is a continuation of application Serial No. 886,507, filed 7/17/86 now abandoned.

BACKGROUND OF THE INVENTION

The present invention relates to a method and apparatus for the impregnation of structural shapes formed by filament windings with thermoplastic binder.

Reinforced plastics are composite materials made up of fibers and polymeric binders that serve as matrices. Intricate shapes are possible with reinforced plastics, which are low density materials having high strength to weight ratios. Reinforced plastics enhance the desirable characteristics of low heat and low electrical conductivity of polymers and selected polymer resistance to water, acid, bass and solvents.

Thermoset resins are typically used in making reinforced plastics. For glass reinforced plastics, the reinforcement material and activated resin are placed in a spinning mold. The mold is heated to cure the resin and centrifugal force assures smooth inner and outer surfaces and the absence of voids in the composite material. This approach is not easily facilitated where the binder is a high molecular weight thermoplastic resin.

Another approach when thermoset resins are used as the binder in filament wound structures is to solution impregnate the fiber tows and then wind them onto a form. This approach is also not easily facilitated where the binder is a high molecular weight thermoplastic resin. Sufficient resin loading of the tow, the necessary amount of drape, and wet-out of the tow may not be achievable without a large number of unit operations.

Although most filament wound structures use thermoset binders, several approaches using thermoplastic binder impregnation have been described. In U.S. Pat. No. 4,319,944, the process involves helically winding strips of reinforced fabric and hot thermoplastic polymer onto a heated mandrel and passing the mandrel under a smooth roller to embed the fabric into the thermoplastic.

In U.S. Pat. No. 4,282,905, a reinforced circular tube is formed by placing a tube of thermoplastic within a close-fitting seamless fabric sleeve of an inert fiber, heating the tube to soften the plastic and expanding the softened tube by inflation or centrifugal force thereby forcing the polymer into the interstices of the fabric sleeve, and cooling the tubes so that an integral pipe is formed.

In United Kingdom Patent No. 2040786A a filament winding on a vertical mandrel is inserted into a mold containing the matrix resin. Impregnation is achieved by vibrating the mandrel or the mold.

In United Kingdom Patent No. 2105247A, thermoplastic yarn is wrapped around reinforcing fibers and the assembly heated under pressure to thermoform the wrapping yarn into a polymer matrix which incorporates the reinforcing fibers.

It is an object of the present invention to provide a method and apparatus for impregnating filament-wound structural shapes with a binder of thermoplastic resin.

It is a further object of the present invention to provide a method and apparatus for manufacturing continuous fiber composites with high molecular weight thermoplastics achieving uniform resin loading and little or no void space.

SUMMARY OF THE INVENTION

In one aspect of the present invention a method of manufacturing composite materials having resin and reinforcing fibers in a centrifugal caster is provided. The method comprises the steps of placing the reinforcing fibers in a rotatable vessel. The vessel is then rotated and a predetermined amount of a solution comprising solvent and resin is added to effect impregnation of the fibers. The concentration of resin to solvent in the solution is about 5 to 25% by weight. The vessel continues to be rotated while the solvent is evaporated. Rotation of the vessel is stopped and the composite material formed is removed, when a predetermined amount of solvent has been condensed.

In another aspect of the present invention, apparatus for centrifugally casting composite materials, including resin and reinforcing fibers, is provided. The apparatus comprises housing means, a rotatable union and bearing means. A vessel is rotatably supported in the housing means by the rotatable union on one end and the bearing means on the other. The rotating union has two passageways providing flow communication from outside the housing to inside the rotatable vessel. Means for supplying measured amounts of solution, including a solvent, is coupled to the first passageway of the rotatable union. Means coupled to the second passageway of the rotatable union is provided for condensing and measuring solvent evaporated from the vessel.

BRIEF DESCRIPTION OF THE DRAWING

While the specification concludes with claims particularly pointing out and distinctly claiming the present invention, objects and advantages of the invention can be more readily ascertained from the following description of preferred embodiments when used in conjunction with the accompanying drawing in which:

DETAILED DESCRIPTION OF THE DRAWING

Figure 1:
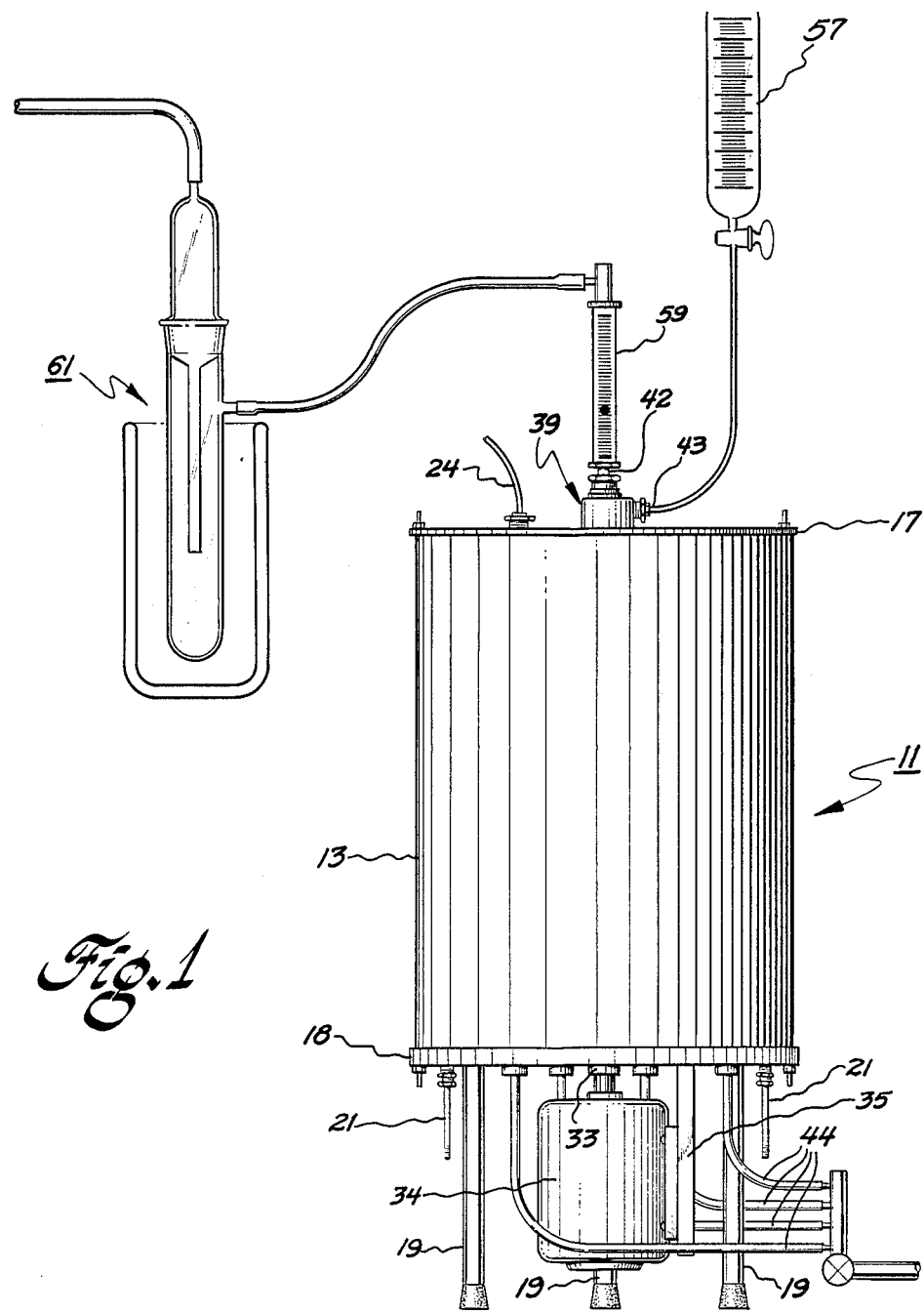
FIG. 1 is a side view of a centrifugal caster in accordance with the present invention.
Figure 2:
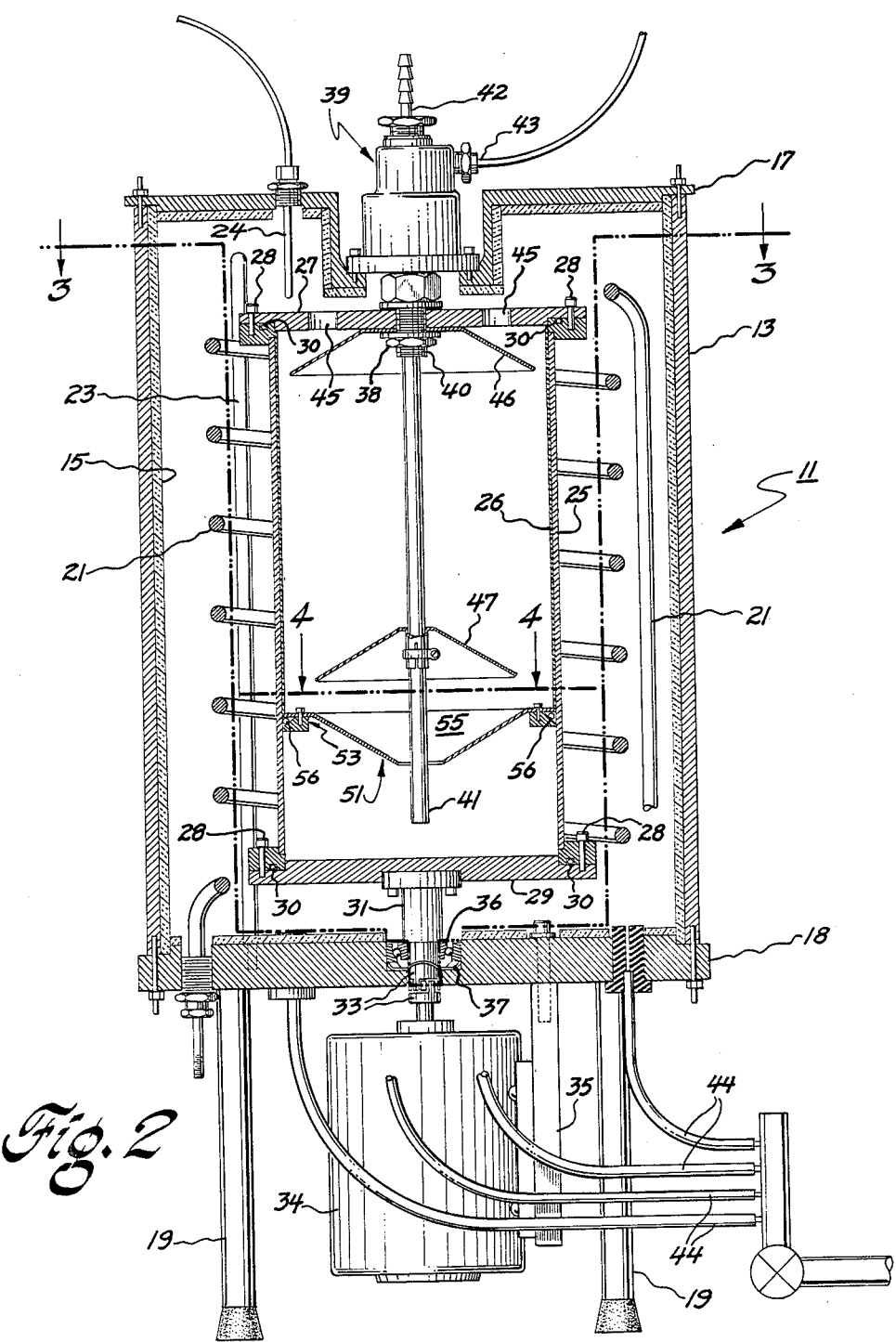
FIG. 2 is a sectional side view of the centrifugal caster o FIG. 1 configured for direct drying.
Figure 3:
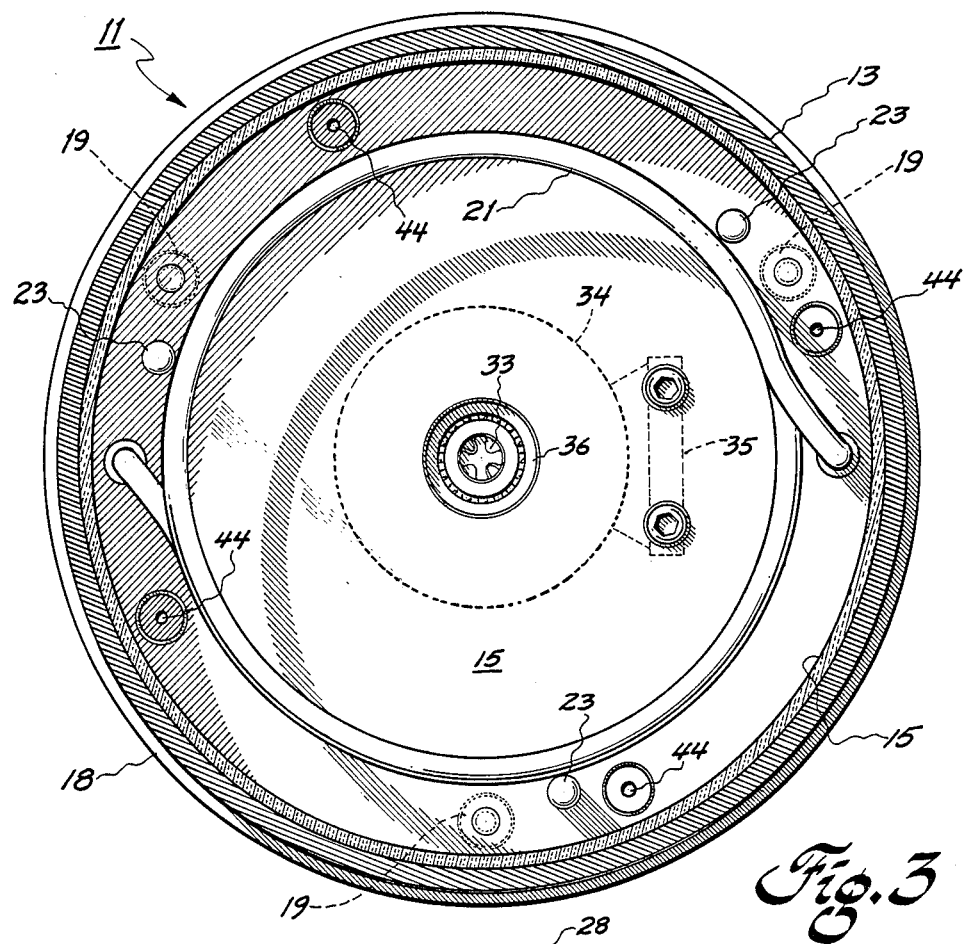
FIG. 3 is a sectional view along the lines 3—3 in FIG. 2.
Figure 4:
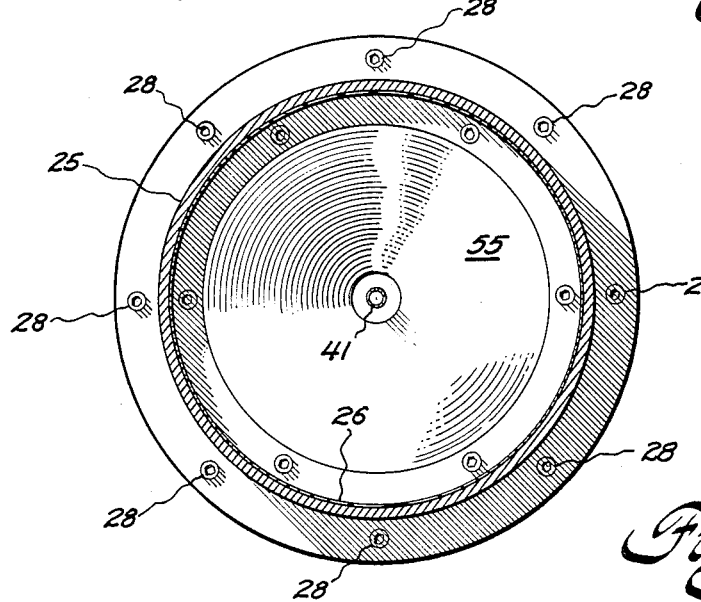
FIG. 4 is a sectional view along the lines 4—4 in FIG. 2.

Referring now to the drawing in which like numerals indicate like elements throughout, and more particularly to FIGS. 1 and 2 thereof, a centrifugal caster 11 is shown. The centrifugal caster comprises a cylindrical oven 13 with a woven non-metallic flexible sheet of insulation 15 lining the interior of the oven walls. The oven can be fabricated from an aluminum tube with circular aluminum end plates 17 and 18, secured to the tube on studs extending from the cylindrical portion of the oven. The oven is shown with its longitudinal axis extending in the vertical direction, supported by three legs 19 attached to the lower end plate. A helical resistance heating element 21 is situated in the oven, with the longitudinal axis of the oven and heating element coaxial with one another. The ends of the heating element extend through the lower oven end plate 18. The helical heating element is positioned by three vertical support rods 23 secured to the lower end plate of the oven and circumferentially spaced about the heating element 21. The position of the heating elements and support rods can be more readily seen in FIG. 3. A thermocouple 24 located near the top of the oven provides feedback to a circuit (not shown) controlling the power supplied to the heating coil.

Situated inside the helical heating element in the oven is a cylindrical shaped centrifuge 25 with flanged ends which can be fabricated of anodized aluminum alloy. Centrifuge 25 further comprises upper and lower end caps 27 and 29, respectively, which can also be fabricated from anodized aluminum, and are secured to the flanged ends of the cylindrical centrifuge by capscrews 28. A polytetrafluoroethylene coated aluminum foil 26 with a walls of the centrifuge. Channel mounted O-rings 30 in the flanged ends insure a tight seal between the end caps and the cylindrical portion of centrifuge 25. The lower end cap 29 of the centrifuge is coupled by a shaft 31 to an Oldham's coupling 33, through the lower end plate 18 of the oven, to a motor 34. Motor 34 is suspended under the lower end plate of the oven by a motor support 35 affixed to the lower oven end plate 18. The shaft 31 is supported laterally and vertically by a ball bearing 36 mounted in the lower end plate of the oven.

The upper end cap connector 27 of the centrifuge is supported laterally by a rotating union 39 which is mounted on the top of the upper end cap 17 of the oven. A rotating threaded conduit 40 extends from the rotating union through the upper end cap of the oven, and through the end cap 27 of the centrifuge where a nut 38 is threaded onto the end of the conduit, resulting in rotation of the conduit when the centrifuge rotates. The bearing 36 and the bearing in the union are preloaded by wavy bearing spring 37 which is situated beneath bearing 36 and compressed when end plate 17 is fastened to the oven 13. The rotating union 39 has coaxial orifices. An inner orifice is coupled to an exhaust tube 41 situated inside the threaded conduit 40 and extending into the centrifuge almost to the bottom. The exhaust tube is in flow communication with an outlet port 42 of the top of the rotating union outside the centrifugal caster. The exhaust tube does not rotate with the centrifuge 25. The outer orifice is in flow communication with an inlet port 43 at the side of the rotating union and with threaded conduit 40.

Low pressure gas, such as nitrogen or air, for example, is delivered by hoses 44 through apertures in the bottom end plate 18 of the oven, for active cooling, circulation and direct drying. The centrifuge 25 has apertures 45 in upper end cap 27 which allow heated gas to flow into the centrifuge.

The apparatus in FIGS. 1 and 2 is configured for gas drying. A generally cone shaped baffle 46, which can be fabricated from stainless steel, is secured to the top of the inside of the centrifuge by the nut 38 threaded onto the threaded conduit 40. The baffle 46 directs gas entering through apertures 45 against the cylindrical walls of the centrifuge. A second generally conical baffle 47, which can be fabricated from stainless steel, is secured to the exhaust tube 41 below the first baffle to direct gas flow against the walls of the centrifuge. A divider 51 is shown in FIG. 2 below the second baffle 47. The divider can be used to adjust the effective height of the centrifuge by changing the divider position. The divider is secured in place by tightening a ring 53, by means of machine screws against the periphery of a disk 55, thereby squeezing an 0 ring 56 against the wall of the centrifuge. The disk 55 has a central aperture larger then the exhaust tube diameter. The disk 55 has a central, generally cone-shaped depression leading to the central aperture. The divider excludes the portion of the centrifuge situated below the divider from the process. A gravity feed system 57 provides a measured amount of solution to inlet port 43 of the rotating union 39. One end of a rotameter 59 is shown in FIG. 1, connected to port 42 of the rotating union in flow communication with the exhaust tube. The other end of the rotameter is connected to a cold trap 61 for condensing solvent.

In operation, the oven end cap and centrifuge are removed as a unit, after the nuts holding the upper oven end plate to the cylindrical wall of the oven 13 are removed. The Oldham's coupling 33 separates permitting the withdrawal of the shaft 31 affixed to the centrifuge. The top of the centrifuge can then be removed by removing cap screws 28 in the upper end cap 27 of the centrifuge, to gain access to the centrifuge interior. A filler type material which can comprise any one of the continuous fiber materials known in the art, including carbon, glass, highly oriented polyimide and boron fibers woven into fabric or aligned as tapes, is placed inside the centrifuge against the walls, which have a polytetrafluoroethylene (PTFE) covering to allow easy release. The divider 51 is positioned as necessary based on the length of the filler material.

The centrifuge is again placed in the oven and rotated by the motor 34 at speeds generally 1000–5000 rpm and especially about 3000–4000 rpm, sufficient to achieve the desired centrifugal force for the 6 inch diameter centrifuge in the present embodiment. Resin material suitable for use in the present invention are those which are of relatively high viscosity so as to require solvent thinning for effective substrate impregnation, such as thermoplastic resins and viscous uncured thermosetting resins or prepolymer. Thermoplastic resins include the polycarbonates, polyimides (including polyetherimides) and polyethersulfones. Thermosetting resin precursors such as epoxy, polyester or polyimides can also be used especially where melt impregnation is not possible because the viscosity is too high. In the case of the polycarbonates, cyclic oligomers capable of polymerization to high molecular weight linear polycarbonates may be employed; such oligomers are disclosed in copending, commonly owned application Ser. No. 704,122, filed Feb. 22, 1985 now U.S. Pat. No. 4,644,053 now U.S. Pat. No. 4,644,053 the disclosure of which is hereby incorporated by reference. Polyimides are typically formed by subsequent imidization (curing) of resin with a substantial portion of amic acid groups. The resin is combined with a solvent which may be any organic liquid which dissolves the resin and which is capable of removal by volatization at atmospheric or reduced pressure over the temperature range convenient for operation for instance, 25°–250° C. Illustrative solvents include hydrocarbons such as heptane, hexane, toluene and xylene; chlorinated hydrocarbons such as methylene chloride, chloroform and chlorobenzene; and aprotic polar solvents such as dimethylformamide, dimethylacetamide, dimethyl sulfoxide and N-methylprrolidone. Mixtures of these solvents may also be used. The concentration of the resin or resin precursor(s) the solution is typically about 5-25% by weight.

The resin and solvent are added by the gravity feed system 57 shown in FIG. 1 or a varistaltic pump (not shown) into the rotating union inlet port 43. The resin and solvent flow from the threaded conduit 40, which is turning with the centrifuge. The solution is evenly distributed along the walls of the centrifuge and wets the reinforcing material. Carrier gas, such as nitrogen or air, enters the bottom of the oven from a 30 psig source and is heated by heating element 21 to a temperature in the range of 25°-250° C. and enters the top of the centrifuge through apertures 45. The nitrogen and solvent vapors are exhausted together thrdugh the exhaust tube 41. The vapors are condensed in a chilled water condenser and collected in a graduated vessel cold trap and the quantity removed measured. Positive pressure in the oven and centrifuge from the gas introduced through the bottom of the oven force the solvent-laden carrier gas out the exhaust tube.

Figure 5:
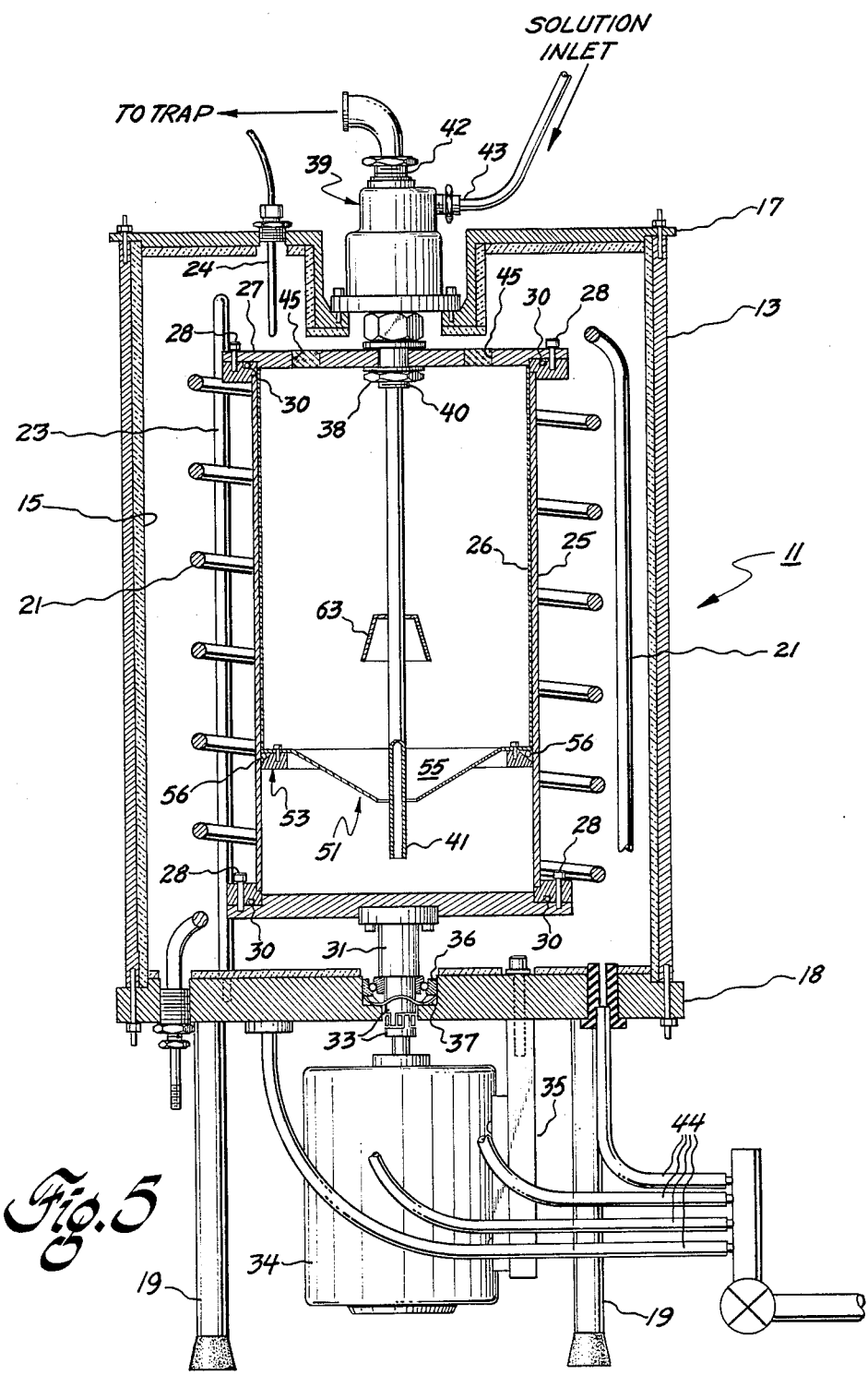
FIG. 5 is a sectional side view of a centrifugal caster configured for indirect drying in accordance with the present invention.

Referring now to FIG. 5, the centrifugal caster is shown configured for indirect or vacuum drying. The apertures 45 in the top end cap 27 of the centrifuge 25 are plugged so that a vacuum condition in the centrifuge can be achieved. The two gas flow diverters 46 and 47 have been replaced by an inverted cup shaped diverter 63 situated approximately midway on the exhaust tube 41. The diverter 63 keeps any portion of the resin and solvent solution introduced into the centrifuge from flowing down the exhaust tube and being exhausted through the exhaust tube without first contacting the cylindrical walls of the centrifuge. After the desired amount of solution and resin are introduced to the spinning centrifuge, the inlet port 43 of the rotating union is plugged and the centrifuge is evacuated via the exhaust tube 41. A vacuum pump (not shown) provides suction to a cold trap (not shown) coupled to outlet port 42. The cold trap captures and measures the recovered solvent. The centrifuge is stopped when the desired amount of solvent, which may or may not be the total of the solvent used, has been recovered.

Figure 6:
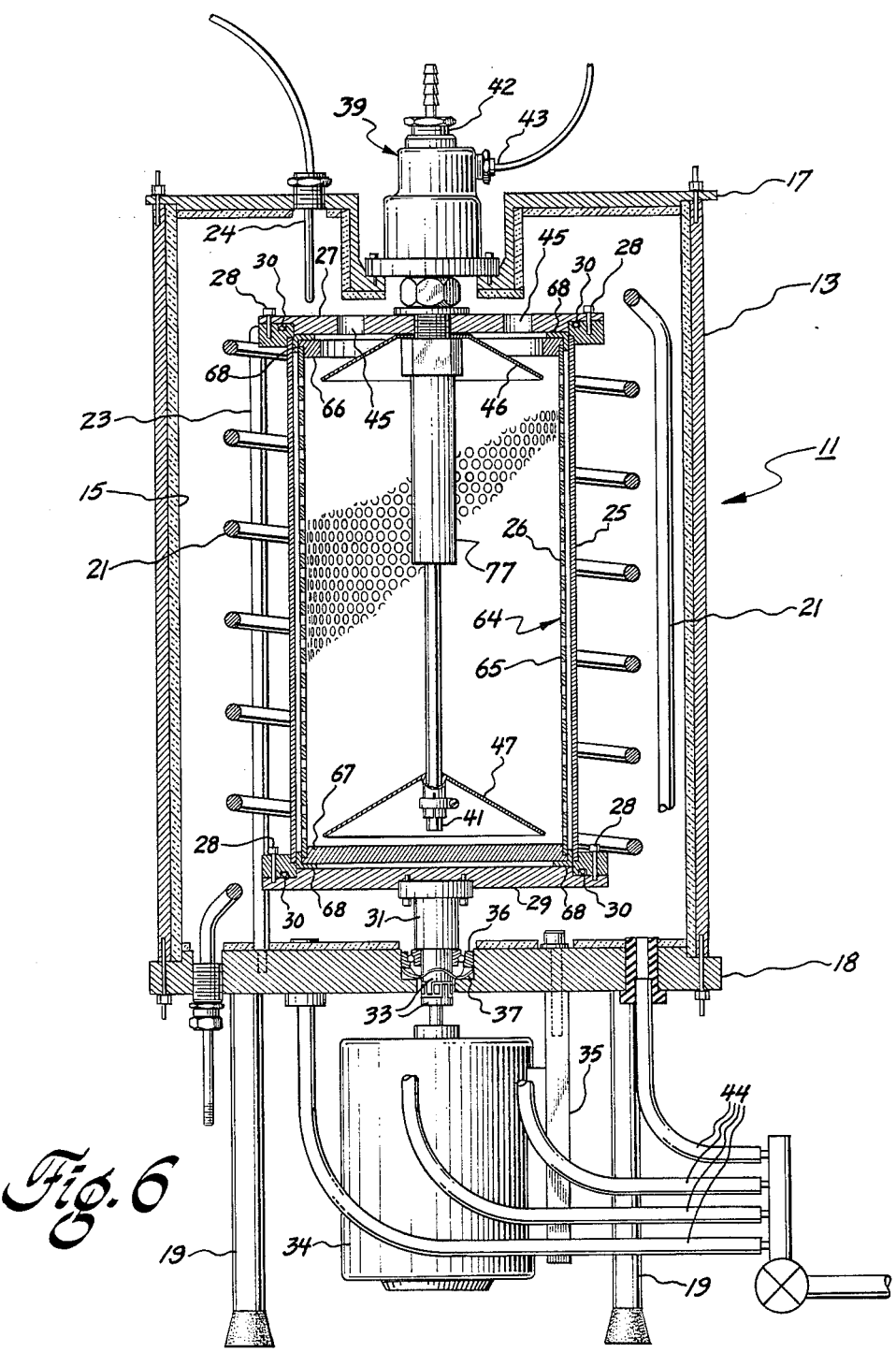
FIG. 6 is a sectional side view of a centrifugal caster with a mandrel configured for direct drying in accordance with the present invention.

Another embodiment of the present invention is shown in FIG. 6, in which a mandrel 64 has been placed in the centrifuge 25 and the centrifuge configured for gas drying. The mandrel can comprise a sheet of stainless steel mesh 65 formed into a cylinder with the ends of the sheet welded together. The mesh is coated with PTFE. The ends of the cylinder are joined to rings 66 and 67 of stainless steel for rigidity. The upper 66 ring has a central aperture to permit access to the interior of the mandrel. Removable end rings 68 of stainless steel are situated on either end of the cylinder, overhanging the ends of the cylinder. The mandrel with the removable end rings is sized so that it fits snuggly in the centrifuge nearly flush with the top of the centrifuge.

Figure 7:
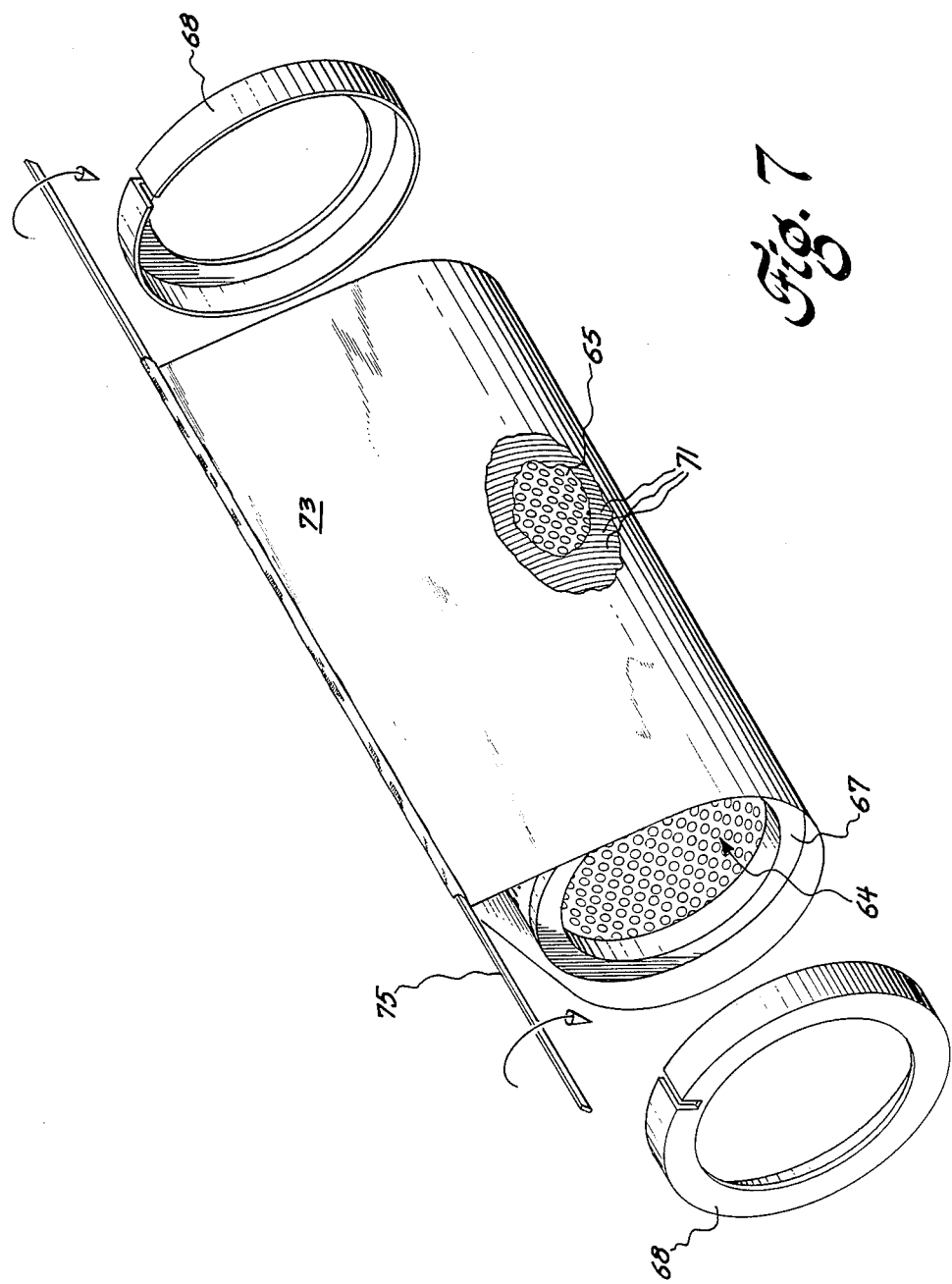
FIG. 7 is an exploded isometric view of the mandrel shown in FIG. 6.

Referring now to FIG. 7 the mandrel is wound tightly with fiber tows 71 on the perforated cylindrical surface of the mandrel, by mounting the mandrel on a conventional lathe and using a guide-pulley system to helically wind the tows. A barrier film of aluminum foil 73 longer than the mandrel and of greater diameter is wrapped around the mandrel once. The two free ends of the foil film are wound together in the same direction on a flat strip of metal 75 longer than the longitudinal length of the mandrel, thereby rolling up the excess material.

Figure 8:
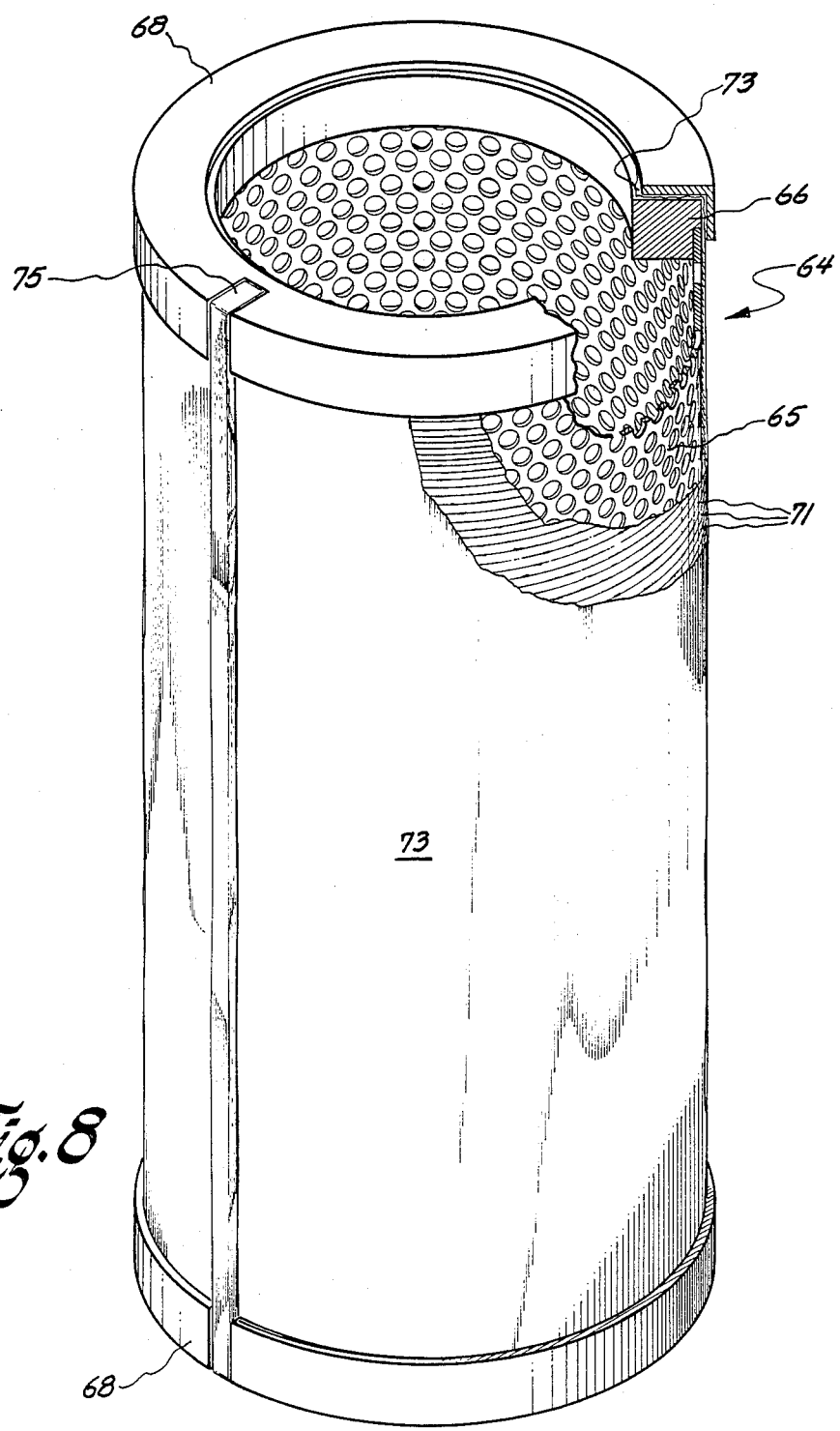
FIG. 8 is a partially cut away isometric of the mandrel shown in FIG. 6.

Referring now to FIG. 8, the foil film at the top and bottom of the mandrel is folded over the ends of the cylinder and the removable end rings 68 situated on either end. The strip of metal 75 fits into slots in the removable end rings and the strips are folded over the end rings.

Referring again to FIG. 6, with the mandrel situated in the centrifuge, solvent and resin can be added through the rotating union 39. An extension 77 of the outer conduit 40 is threaded onto the outer conduit, so that the solvent and resin enter the centrifuge approximately in the center of the centrifuge. Baffles 46 and 47 at the top and bottom of the centrifuge direct gas flow along the walls. When the solvent and resin enter the spinning centrifuge they are evenly distributed along the perforated inner walls of the mandrel wetting the wrapped filaments or tows 71. The barrier foil film 73 prevents the solution and resin from contacting the walls of the centrifuge assuring impregnation of the fibrous tape and permitting easy removal of the mandrel when the process is complete.

Figure 9:
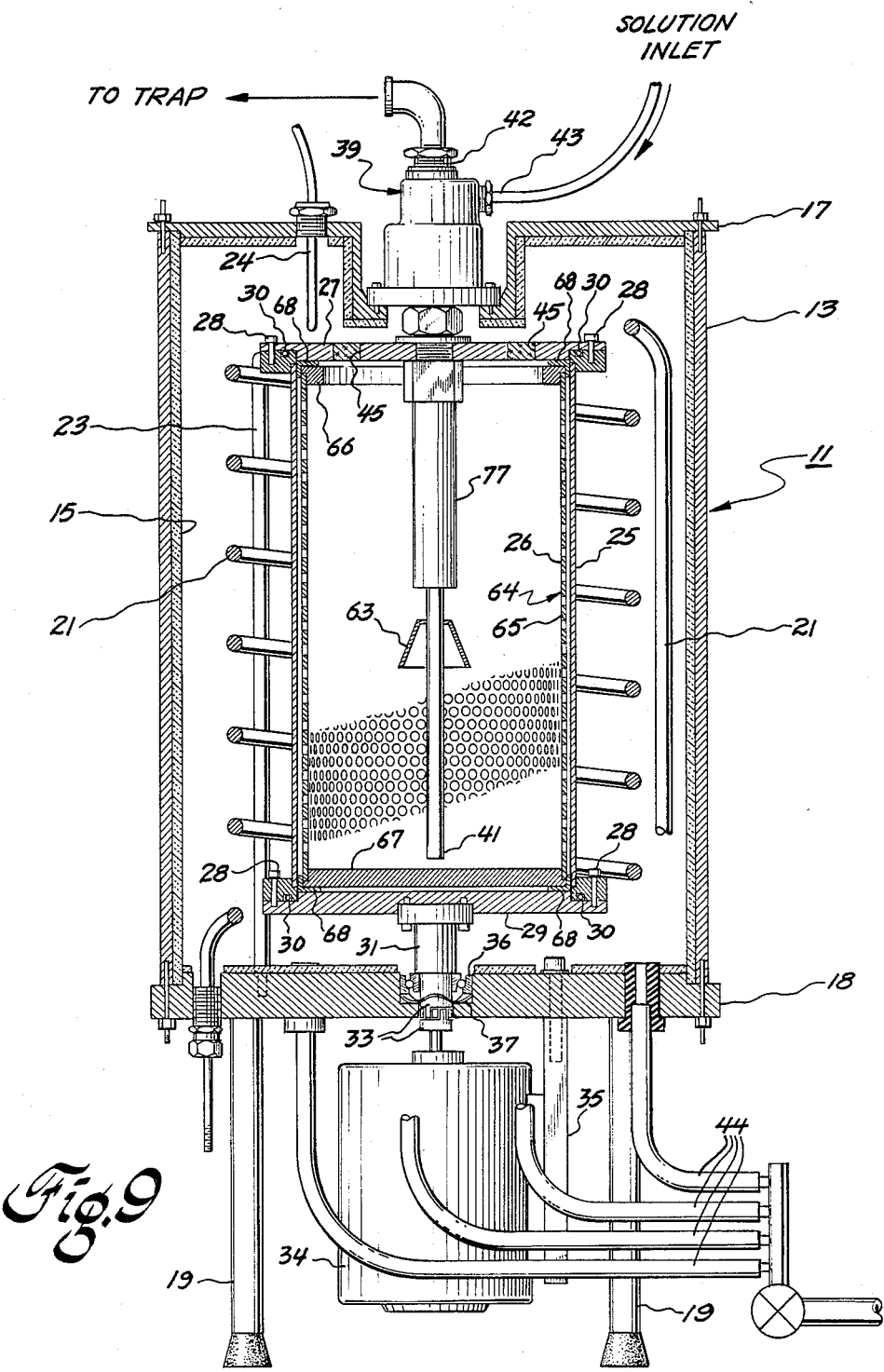
FIG. 9 is a sectional side view of a centrifugal caster with a mandrel, configured for indirect drying in accordance with the present invention.

Referring now to FIG. 9 the mandrel is shown in a centrifugal caster configured for indirect (vacuum) drying. The mandrel is configured the same as when gas drying is used. The apertures 45 in the upper end cap of the centrifuge are plugged. The extension 77 for the outer conduit is again used. The upper and lower baffles 46 and 47 are not used since carrier gas does not need to be deflected along the walls. The inverted cup 63 is secured to the exhaust tube 41 to prevent any solvent and resin from traveling directly to the exhaust tube aperture without contacting the mandrel walls. A measured amount of polymer solution is added to the spinning centrifuge. The port 43 is plugged and the centrifuge vacuum pumped. The centrifuge is heated by the heating element and a limited nitrogen flow around the centrifuge provides even heat distribution. The solvent recovered in the cold trap is measured facilitating the removal of a predetermined amount removed from the centrifuge.

The mandrel used in the direct and indirect drying mode does not have to be a circular cylinder. The outer surface can have different shapes as long as a barrier film can be made to follow the contour. In extreme cases, additional mass may need to be added to the rotating assembly to achieve dynamic balance. If there are apertures in the filament wound shape, such as a radial opening in a pipe, plugs can be inserted before impregnation to prevent large resin build-ups. If the inner surface of the finished part is to be non-circular, then plugs can also be used to achieve the desired contour.

The invention will be further clarified by a consideration of the following examples, which are intended to be purely exemplary of the use of the invention.

EXAMPLE 1

Great Lakes Carbon provided their Fortafil 3(C) high-strength, intermediate-modulus carbon fiber in a 50000-count tow combed into a 2.3 cm by 0.025 cm tape and held together by 3-5% by weight of a primer resin. In the present case the resin was either Ultem ® 1000 polyetherimide Lexan ® 125 bisphonol-A-based polycarbonate according to the manufacturer, and as verified by Fourier transform infrared spectroscopy (FTIR). FTIR spectra were run on films cast from solutions that were made by extracting the primer from the tows, either with dichloromethane or chloroform. In the case of the polyetherimide sized tape, grazing-angle FTIR measurements on the as-received tape were in total agreement with the previous assignment.

The tapes were cut to exactly 45.7 cm in length and placed around the inner surface of the centrifuge. The spool was not used in this application. The two ends of the 45.7 cm tape were in contact, causing the tape to lie flat against the centrifuge wall. Starting at the top of the centrifuge cylinder, tapes were placed, one against another, until the desired prepreg width had been attained. All tape ends were located vertically one above another. The divider, described above, was moved into place at the bottom edge of the unidirectional mat.

A 10% by volume solution was made, either of Ultem polyetherimide or of bisphenol-A-based polycarbonate, in dichloromethane. Enough polymer as used, so that the resulting prepreg would be 50% fibers by volume assuming 1.80 g/cc for the fibers, 1.20 g/cc for polycarbonate and 1.27 g/cc for polyetherimide. The polymer in the solution matched the primer on the fibers. The 25 C solution was filtered through paper, to remove coarse impurities, into a dispensing buret. The centrifuge was brought up to speed, 3000-3500 rpm, and the solution was pumped in. After 20 minutes nitrogen gas flow through the centrifuge was initiated at a rate of <1000 ml/min. After 20 minutes, the flow rate was increased to >10000 ml/min and held for approximately 40 min. Flow was turned off and the centrifuge was stopped and disassembled. The prepreg, which was easily separated from the anodized aluminum surface of the centrifuge exhibited wet-out on both sides. The prepreg was typically stored in vacuum at 100° C. overnight to effect solvent removal. At this stage of the process, aging is not a concern.

The prepreg was cut by scissors along the line where the ends of the 45.7 cm tape strips met. The boardy, curved prepreg was placed between PTFE-coated aluminum foil, and the assembly was placed into a pre-heated platen press. The platen temperature depended on the resin, but was always higher than that resin's glass transition temperature. A typical platen temperature for polycarbonate prepregs is 225° C. After a few minutes, the foil/prepreg/foil sandwich was removed from the press and the flattened prepreg was separated from the foils.

The prepreg was blade-cut into swatches that fit closely in a tool-steel, matched-die compression mold. Two different molds, 12.7×1.3 and 14.0×11.4 cm, have been used. These swatches were stacked to a nominal thickness of 0.24 cm in pre-heated molds that had been treated with Frekote 44 mold release. Both unidirectional and cross-ply stacking sequences have been used. Standard compression molding resulted in laminates that were easily demolded. Reflection microscopy on polished cross-sections revealed that wet-out was nearly perfect, as was orientation. These composites have performed very well in dynamic mechanical studies.

EXAMPLE 2

Example 2 is similar to Example 1, except that the unidirectional carbon fiber tape was replaced with Hercules Magnamite AS4 high-strength, high-modulus carbon fibers. The fabric's thickness is 0.041 cm. The fabric is supplied by the manufacturer sized with a proprietary primer known as "W size".

In this case a single swatch of the fabric was cut from stock, 45.7 cm by whatever width was desired. The swatch was then applied to the inside of the centrifuge's cylindrical surface. Impregnation and molding was carried out as described above using Lexan 125 polycarbonate as the binder resin.

EXAMPLE 3

Kevlar 49 aromatic polyamide fiber was obtained as unsized tow. The spool assembly was mounted on a lathe, and the fiber tow was wound into a uniform, highly aligned tape over the length of the mandrel. The winding rate of 28.4 revolutions/inch produced a tape which was 0.028 cm thick. A PTFE sheet, 0.051 cm in thickness, was cut to an appropriate size so as to cover the windings and fit within the end caps of the mandrel. The PTFE sheet was wrapped around the windings and all seams were glued with General Electric's Silicone RTV paste, which was cured overnight. The PTFE film was held tightly against the windings by an elasticized, mesh nylon tubing of the same length, which was stretched over the PTFE film.

The mandrel assembly was lowered into the centrifuge, and impregnation using polyetherimide proceeded as in Example 1 above. The density assumed for aromatic polyimide fiber is 1.44 g/cc. The RTV seal proved to be less than optimum, due to swelling in the presence of dichloromethane, and some of the solution escaped to the centrifuge wall, where a thin, neat polyetherimide film formed. The prepreg formed in this process therefore had a composition which was more than 50% fibers by volume. The prepreg was removed from the mandrel assembly by cutting down the length of the mesh. The product was uniform and cohesive. No composite has been produced from this prepreg.

EXAMPLE 4

The apertures in the top cap of the centrifuge were plugged. The baffles which modify the flow pattern of the carrier gas in the case of direct drying were removed in the present case.

A varistaltic pump normally used for solution feed was replaced with a gravity feed system. This simplification was made since vacuum operation requires batch feeding. The rotameter which measures solution feed rate was removed.

A pair of Pyrexglass cold traps in parallel, was inserted in line downstream of the centrifuge. These are plumbed to facilitate rapid switch-over from one to the other, allowing for waste solvent disposal without any interruption of the drying process. The traps exhaust to a vacuum pump. The trap basins are etched with calibration marks which allows for an accurate determination of the trapped solvent volume which in turn can be used in a mass balance to determine the extent of drying. Between the traps and the pump a vacuum gage monitors the pressure. The rotameter which monitors gas exhaust rate was removed from the line.

As before, nitrogen gas was introduced to the oven, although the only exhaust port available to the gas was through the opening at the bottom of the oven provided for the drive shaft. The gas was used in this case for passive, convective cooling of the heating coil. The flow rate was minimal. The traps were placed in dewars filled with ice and water. The conical divider was inserted 15.2 cm from the top of the centrifuge, and a piece of Hercules Magnamite A370-8H carbon fabric, 15.2 by 45.7 cm, was inserted along the centrifuge wall. This fabric has been described in a previous example. Before inserting the fabric, the centrifuge's wall had been lined with Fluoroglas Trifoil #903, polytetrafluoroethylene coated aluminum foil with a silicone adhesive backing. With the centrifuge operating at 60 rpm, the temperature was raised to 80° C. in the oven. The oven was held at 80° C. and 73 cm of vacuum for two hours to effect vacuum dessication of the epoxy sizing on the carbon fabric. With the exhaust vented to air and the rotational speed accelerated to 3000 rpm, 100 ml of N,N-dimethylformamide DMF was fed into the centrifuge. Immediately thereafter 100 ml of a 0.1 by volume DMF solution of a novel polyether-amic acid (described and claimed in copending application Ser. No. 704,122) was fed into the centrifuge. Drying at 73 cm of vacuum and 80° C. was initiated and continued until most of the solvent had been trapped. Solvent was observed to boil out of the centrifuge during this process, which is expected since the boiling point of DMF at this pressure is around 50° C. The centrifuge was decelerated and cooled, after which a high-quality prepreg was easily removed from the PTFE-coated centrifuge. The prepreg had drape and tack properties that were qualitatively similar to those of B-staged epoxy prepregs due to the presence of residual solvent. Excluding residual solvent, the prepreg was calculated to be 59% by volume in carbon fiber. Infrared spectroscopy showed the resin to be virtually pure in polyether-amic acid bonds; no absorption was found in the polyimide bands.

The foregoing describes a method and apparatus for the impregnation of filament wound structures with thermoplastic binders for manufacturing continuous fiber composites with high molecular weight thermoplastics achieving uniform resin bonding and little or no void space.

While the invention has been particularly shown and described with reference to preferred embodiments thereof, it will be understood by those skilled in the art that various changes in form and details may be made without departing from the spirit and scope of the invention.

What is claimed is:

1. A method of manufacturing composite materials having plastic resin and reinforcing fibers in a centrifugal caster, the method comprising the steps of:
   winding the reinforcing fibers around a mandrel having perforated walls;
   enclosing the mandrel in an imperforate barrier film which surrounds the reinforcing fibers;
   rotating the enclosed mandrel;
   adding a predetermined amount of a solution of solvent and plastic resin to the interior of the mandrel to effect impregnation of fibers, the barrier film preventing the spinning off of the solution, the fibers remaining in contact with the solution continuing rotation of the vessel while evaporating said solvent at a controlled rate; and
   stopping rotation of the enclosed mandrel and removing the composite material formed from the fibers and elastic resin when a predetermined amount of solvent has been evaporated.

2. The method of claim 1 further comprising the step of condensing and measuring the evaporated solvent.

3. The method of claim 1 further comprising the step of directing hot gas through the vessel to evaporate the solvent.

4. The method of claim 1 wherein the solvent is evaporated by subjecting the rotating mandrel to a vacuum condition.

5. The method of claim 1 further comprising the step of heating the mandrel.

6. The method of claim 1 wherein the resin comprises thermoplastic resin.

7. The method of claim 1 wherein the resin comprises viscous thermoplastic resin requiring solvent thinning for effective substrate impregnation below 250° C.

8. The method of claim 2 wherein the resin comprises a viscous uncured thermosetting resin requiring solvent thinning for effective substrate impregnation below 250° C.

9. The method of claim 1 wherein said solution has a concentration of resin to solution of about 5 to 25% by weight.

* * * * *